United States Patent [19]

Ehrlinger et al.

[11] 4,213,514
[45] Jul. 22, 1980

[54] HYDRAULIC WHEEL DRIVE WITH CLUTCH

[75] Inventors: Friedrich Ehrlinger; Egon Mann; Manfred Fischer, all of Friedrichshafen; Rudolf Jocham, Langenargen, all of Fed. Rep. of Germany

[73] Assignee: Zahnradfabrik Friedrichshafen AG, Friedrichshafen, Fed. Rep. of Germany

[21] Appl. No.: 948,234

[22] Filed: Oct. 3, 1978

[30] Foreign Application Priority Data

Oct. 6, 1977 [DE] Fed. Rep. of Germany ....... 2744977

[51] Int. Cl.² ............................................. B60K 17/14
[52] U.S. Cl. .................................... 180/308; 74/801; 180/247
[58] Field of Search ............... 180/66 F, 65 F, 44 F, 180/44 M, 242, 247, 307, 308; 74/13, 687, 732, 801

[56] References Cited

U.S. PATENT DOCUMENTS

| | | | |
|---|---|---|---|
| 3,215,001 | 11/1965 | Zundel | 74/732 |
| 3,422,917 | 1/1969 | Guinot | 180/44 F |
| 3,439,766 | 4/1969 | Dence et al. | 180/66 F |
| 3,480,099 | 11/1969 | Nighswonger et al. | 180/44 M |
| 3,608,661 | 9/1971 | Arnot | 180/66 F |
| 3,770,074 | 11/1973 | Sherman | 180/65 F |
| 3,865,207 | 2/1975 | Schwab et al. | 180/66 F |
| 4,043,226 | 8/1977 | Buuck | 180/65 F |

FOREIGN PATENT DOCUMENTS

| | | | |
|---|---|---|---|
| 1550904 | 9/1969 | Fed. Rep. of Germany | 180/308 |
| 1806022 | 5/1970 | Fed. Rep. of Germany | 180/66 F |
| 422671 | 4/1967 | Switzerland | 180/308 |
| 1247566 | 9/1971 | United Kingdom | 180/308 |

*Primary Examiner*—David M. Mitchell
*Attorney, Agent, or Firm*—Karl F. Ross

[57] ABSTRACT

A wheel drive for a piece of construction equipment or the like has a hydraulic motor mounted in a wheel support on which is rotatable the wheel-carrying hub. The output shaft of the motor is connected to one member of a clutch whose other member is connected to a two-stage planetary-gear transmission whose output gear is a ring gear integrally formed in the wheel hub. The clutch is pneumatically actuatable through a passage extending axially through the motor shaft.

9 Claims, 1 Drawing Figure

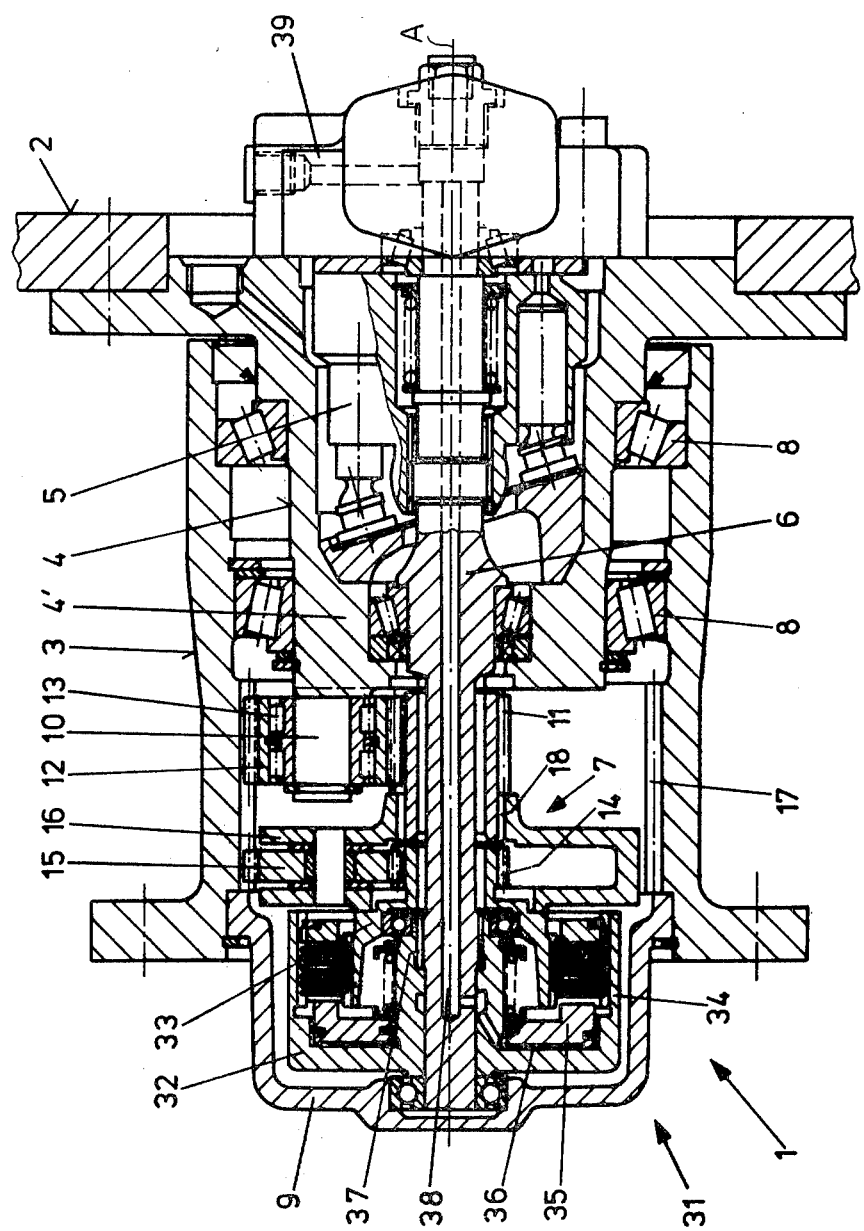

HYDRAULIC WHEEL DRIVE WITH CLUTCH

FIELD OF THE INVENTION

The present invention relates to a wheel drive. More particularly this invention concerns such a drive as used on the wheel of a piece of heavy construction-type equipment.

BACKGROUND OF THE INVENTION

It is known to provide heavy construction-type equipment at each of its wheels with a so-called wheel drive. Such a drive usually has a hydraulic motor and a transmission, normally of the planetary-gear type, connected between the wheel and the frame. Each wheel has such a drive for maximum maneuverability and to eliminate a lengthy drive shaft, which normally cannot be accommodated on such a vehicle.

Such wheel drives are extremely effective at low speeds, and indeed give excellent traction as all wheels are powered. At high speeds, however, it is standard parctice to employ only the wheel drives of the front or rear wheels. The full output of the pump of the machine is fed only to the two drives that are used. During such high-speed operation the nondriving wheel drives are, however, still driven pump-fashion by their respective wheels. In order to minimize friction the intakes and outputs of these drives are connected together so that the motors present little resistance to rotation.

Such an arrangement has been found unsatisfactory. First of all even though the intakes and outputs are connected together, the motors do normally present some drag on the wheels, so that energy is wasted. At the same time the motors are operated at high speed and often are subjected to excessive wear during such operation, when in fact the motors are doing no useful work. As a result the service life of such a wheel drive is correspondingly reduced.

OBJECTS OF THE INVENTION

It is therefore an object of the present invention to provide an improved wheel drive.

Another object is the provision of such a drive which overcomes the above-given disadvantages.

SUMMARY OF THE INVENTION

These objects are attained according to the instant invention in a wheel drive wherein connected between the generally nonrotatable wheel support and the rotatable wheel hub is a hydraulic motor, a planetery-gear transmission, and a clutch. The clutch is mounted directly in the wheel hub between the motor and the transmission. The motor in turn is mounted on the vehicle frame or support and the planetary-gear transmission is in turn mounted on the hub.

Thus with the system according to the instant invention the motor can be completely uncoupled from the hub. Therefore during high-speed wheel operation the motor is not driven at all. The service life of the motor is correspondingly increased and when uncoupled the motor presents no drag at all on the wheel. Furthermore the entire assembly can be made extremely eompact, and the arrangement can be set up so that the clutch itself is serviceable from outside the wheel without removal of the hub from the vehicle frame or support.

According to another feature of this invention the planetary-gear transmission includes a pair of sets of planetary gears. The sun gear of one of the sets of planetary gears is connected to one of the members of the clutch whose other clutch member is rotationally fixed via splines directly on the output shaft of the motor. A planet carrier has a plurality of planet gears that mesh with this sun gear and that mesh with a ring gear integrally formed inside the hub which is preferably of tubular shape. This planet carrier is splined to another sun gear rotatable on the output shaft and meshing with a plurality of further planet gears each carried on a respective pin mounted directly on the wheel support and each in turn meshing with the ring gear formed integrally with the hub. Thus a double stepdown is achieved and an extremely short axial length. The gears are all set up so as to be self centering.

According to further features of this invention the clutch includes a pair of clutch members and a piston arrangement for rotationally coupling the two together. This piston is pressurizable by means of a chamber that is connected through a passage extending axially along the output shaft of the motor to a fluid supply on the vehicle frame. As the fluid is fed axially through this shaft it is possible for the entire clutch to rotate with the respective part of the transmission while still remaining pressurized.

In accordance with this invention the clutch is mounted at the input side of the planetary-gear transmission so that it need not be able to transmit the full torque that is eventually applied to the wheel hub. Thus even though the wheel is driven with a considerable torque at the output side of the transmission, the input side instead rotates merely at very high speed so that a relatively small drive can be employed.

BRIEF DESCRIPTION OF THE DRAWING

The sole FIGURE of the drawing is an axial section through a clutch according to the instant invention.

SPECIFIC DESCRIPTION

As shown in the drawing a wheel drive 1 according to the instant invention basically comprises a hollow hub support 4 mounted on the fixed vehicle frame 2 and rotatably supporting tubular wheel hub 3 by means of two sets of roller bearings 8. The vehicle wheel is bolted to the flange of the hub 3. The hub support 4 has a projection 4' which is hollow and in which is received an axial-piston motor 5 having a motor shaft 6 effective through a clutch 31 and a planetary-gear transmission 7 on the hub 3. The cupped cover plate 9 constituting an end wall of the hub 3 is releasably secured therein and extends generally perpendicular to an axis A on which the tubular hub 3 is centered along with the shaft 6.

The projection 4' of the hub support 4 is provided with three angularly equispaced and axially extending mounting pins 10 each of which carries via roller bearings 13 a respective planet gear 12. The inside of the tubular hub 3 is formed with an array of ring-gear teeth 17 with which the planet gears 12 mesh.

The shaft 6 is connected via the clutch 31 to a sun gear 14 that meshes with a plurality of second planet gears 15 carried on a planet carrier 16 in turn connected via splines 18 to a sun gear 11 which is rotatable on the shaft extension 6' and which meshes with the first planet gears 12. The second planet gears 15 also mesh with the ring-gear teeth 17 of the hub 3.

The shaft 6 has an inner end which extends through the motor-vehicle frame 2 and which can be acted on by either a disk brake or a drum brake.

The clutch 31 comprises a first clutch element 32 connected via splines 37 to the shaft 6 and a second clutch element 33 unitary with the second sun gear 14. A piston 35 can be displaced against a pack 34 of clutch disks to lock the two members 32 and 33 rotationally together. To achieve this a pneumatic fluid supply arrangement 39 is connected inside the frame 2 of the vehicle with a passage 38 extending axially through the shaft 6‴ and opening into the chamber 36 behind the piston 35.

This clutch arrangement has the considerable advantage that a clutch that transmits relatively limited torque can be used to connect the motor 5 to the hub 3, as it is provided at the input side of the transmission 7. Similarly this clutch can be energized from inside the frame but serviced from outside the vehicle, simply by removing the cap 9. During high-speed road travel the clutch 31 can be opened so that the hub 3 will merely drive the planetary-gear transmission 7, but will not turn the rotor of the motor 5.

I claim:
1. A wheel drive comprising:
 a generally nonrotatable wheel support;
 a hydraulic motor mounting on said support and having an output shaft having an outer end and extending outwardly away from said support;
 a wheel hub surrounding said shaft, rotatable on said support about a wheel axis, and having an open side turned outwardly away from said wheel support;
 a clutch mounted in said wheel hub and having a first clutch member connected to said outer end of said output shaft and a second clutch member lying between said first member and said nonrotatable wheel support;
 a cover plate covering said open side of said wheel hub and removable to give access to said clutch; and
 a planetary-gear transmission between said clutch and said motor and having an input gear connected to said second clutch member and an output gear rotationally fixed on said hub.

2. The drive defined in claim 1 wherein said motor is an axial-piston motor.

3. The drive defined in claim 2 wherein said output shaft is formed with an at least partially axially extending passage, said clutch including fluid supply means connected through said passage to said members for coupling same together and for thereby coupling said output shaft to said input gear.

4. The drive defined in claim 1 wherein said first clutch member is rotationally fixed on said output shaft.

5. The drive defined in claim 1 wherein said planetary gear transmission includes a sun gear connected to said second clutch member, a planet gear rotatably mounted on said support, and a ring gear integral with said hub and constituting said output gear, said planet gear meshing with said sun and ring gears.

6. The drive defined in claim 5 wherein said transmission further includes a second such sun gear rotationally directly coupled to said second clutch member and constituting said input gear, a planet carrier, and a second planet gear carried on said carrier and meshing with said ring gear and with said second sun gear, said planet carrier being rotationally directly coupled to the first-mentioned sun gear.

7. The drive defined in claim 1 wherein said clutch includes fluid-operable actuating means for pressing said members axially together for rotationally coupling same, said actuating means being carried on said first clutch member.

8. The drive defined in claim 1 wherein said support has a hollow projection receiving said motor.

9. The drive defined in claim 1 wherein said output shaft extends axially to both sides of said motor, said drive further comprising a wheel brake carried on said frame and connected to that side of said shaft opposite said clutch.

* * * * *